(12) United States Patent
Calcaterra et al.

(10) Patent No.: US 10,585,939 B2
(45) Date of Patent: Mar. 10, 2020

(54) REAL TIME OBJECT DESCRIPTION SERVICE INTEGRATED WITH KNOWLEDGE CENTER ON AUGMENTED REALITY (AR) AND VIRTUAL REALITY (VR) DEVICES

(71) Applicant: International Business Machines Corporation, Armonk, NY (US)

(72) Inventors: Jeffrey A. Calcaterra, Chapel Hill, NC (US); Si Bin Fan, Beijing (CN); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/290,954

(22) Filed: Oct. 11, 2016

(65) Prior Publication Data

US 2018/0101550 A1 Apr. 12, 2018

(51) Int. Cl.
*G06F 16/00* (2019.01)
*G06F 16/58* (2019.01)
*G06K 9/00* (2006.01)
*G06N 5/02* (2006.01)
*G06N 5/00* (2006.01)

(52) U.S. Cl.
CPC ..... *G06F 16/5866* (2019.01); *G06K 9/00671* (2013.01); *G06N 5/022* (2013.01); *G06N 5/003* (2013.01)

(58) Field of Classification Search
None
See application file for complete search history.

(56) References Cited

U.S. PATENT DOCUMENTS 7,116,801 B2 10/2006 Lin
7,856,121 B2 12/2010 Lin
(Continued)

FOREIGN PATENT DOCUMENTS

CN 102353351 B 1/2014
EP 1431798 A2 6/2004
(Continued)

OTHER PUBLICATIONS

Moisescu et al., "Towards the Development of Interoperable Sensing Systems for the Future Enterprise," Journal of Intelligent Manufacturing, 2014, pp. 33-54.
(Continued)

*Primary Examiner* — Bai D Vu
(74) *Attorney, Agent, or Firm* — Zilka-Kotab, P.C.

(57) ABSTRACT

In one embodiment, a system includes a processing circuit and logic integrated with the processing circuit, executable by the processing circuit, or integrated with and executable by the processing circuit. The logic is configured to cause the processing circuit to obtain an image of an object viewed by a user of an augmented reality or virtual reality device (hereafter the AR/VR device). The logic is also configured to cause the processing circuit to determine one or more keywords that describe the object and search at least one knowledge base using the one or more keywords and contextual factors to produce context relevant to the object. Moreover, the logic is configured to cause the processing circuit to send the context to the AR/VR device.

14 Claims, 7 Drawing Sheets

(56) References Cited

U.S. PATENT DOCUMENTS

| | | | |
|---|---|---|---|
| 2002/0167512 A1* | 11/2002 | Lee | H04N 13/0014 345/419 |
| 2005/0071323 A1* | 3/2005 | Gabriel | G06F 17/30817 |
| 2010/0094866 A1* | 4/2010 | Cuttner | G06F 17/30035 707/723 |
| 2011/0153310 A1 | 6/2011 | Ehlen et al. | |
| 2011/0225069 A1* | 9/2011 | Cramer | G06Q 30/06 705/27.1 |
| 2012/0038670 A1 | 2/2012 | Choi et al. | |
| 2012/0092373 A1* | 4/2012 | Ryu | G06T 19/006 345/633 |
| 2012/0314096 A1* | 12/2012 | Kruglick | G06T 19/006 348/222.1 |
| 2012/0327119 A1* | 12/2012 | Woo | G06F 3/147 345/633 |
| 2013/0083003 A1* | 4/2013 | Perez | G06F 3/005 345/419 |
| 2013/0278634 A1 | 10/2013 | Xu et al. | |
| 2013/0293580 A1* | 11/2013 | Spivack | G06Q 30/0643 345/633 |
| 2013/0346168 A1* | 12/2013 | Zhou | G06F 1/163 705/14.4 |
| 2014/0024009 A1* | 1/2014 | Nealon | G09B 5/12 434/362 |
| 2014/0270482 A1* | 9/2014 | Chakraborty | G06K 9/00221 382/154 |
| 2015/0097862 A1 | 4/2015 | Reisner-Kollmann et al. | |
| 2015/0104080 A1 | 4/2015 | Holman et al. | |
| 2016/0378861 A1* | 12/2016 | Eledath | G06K 9/00718 707/766 |
| 2017/0287038 A1* | 10/2017 | Krasadakis | G06Q 30/0201 |
| 2017/0358024 A1* | 12/2017 | Mattingly | G06F 3/041 |
| 2018/0040161 A1* | 2/2018 | Tierney | G06T 19/006 |

FOREIGN PATENT DOCUMENTS

| | | |
|---|---|---|
| WO | 2014035041 A1 | 3/2014 |
| WO | 2016025053 A2 | 2/2016 |
| WO | 2016032892 A1 | 3/2016 |

OTHER PUBLICATIONS

Google Street View, "What it Takes to be Trusted," Oct. 6, 2016, pp. 1-4, Retrieved From https://www.google.com/streetview/earn/.

Merchant View 360, "Showcase the Inside of Your Business 24/7 to Local Online Visitors with a Google 360 Virtual Tour," Mar. 28, 2016, pp. 1-3, Retrieved From http://merchantview360.com/pricing/.

Pro Media 360, "What is Google Business Photos 360 Virtual Business Tour Explained," Aug. 26, 2013, pp. 1-3, Retrieved From https://www.youtube.com/watch?v=ZCXRf-CCtqs.

Chow, "Yelp's Secret Augmented Reality Tool," Aug. 28, 2009, pp. 1-5, Retrieved From http://www.psfk.com/2009/08/yelps-secret-augmented-reality-tool.html.

National Instruments, "Picture Quality Analysis: Real-Time Measurements for Objective Video Quality," Aug. 17, 2015, pp. 1-4, Retrieved From http://www.ni.com/product-documentation/12703/en/.

Sun et al., Gait Characteristic Analysis and Identification Based on the iPhone's Accelerometer and Gyrometer, Sensors 2014, vol. 14, Sep. 9, 2014, pp. 17037-17054.

Arthur, Augmented Reality: It's Like Real Life, But Better, The Guardian, Mar. 20, 2010, pp. 1-4, Retrieved From https://www.theguardian.com/technology/2010/mar/21/augmented-reality-iphone-advertising.

IBM Watson Developer Cloud, "Visual Recognition," Aug. 27, 2016, pp. 1-2, Retrieved From https://visual-recognition-demo.mybluemix.net/.

Wikipedia, "Identification Key," Mar. 10, 2016, pp. 1-3, Retrieved From https://en.wikipedia.org/wiki/Identification_key.

\* cited by examiner

REAL TIME OBJECT DESCRIPTION SERVICE INTEGRATED WITH KNOWLEDGE CENTER ON AUGMENTED REALITY (AR) AND VIRTUAL REALITY (VR) DEVICES

BACKGROUND

The present invention relates to dynamic object description service integrated real time knowledge center Software as a Service (SaaS) on augmented reality (AR) and virtual reality (VR) devices.

Users of the Internet are able to utilize the vast resources available to find information and research any topic of interest on any type of device capable of accessing the Internet.

One particular type of information that is available on the Internet in massive quantities are images. To access a particular image, an image search is performed which typically relies on text keyword searching that describes aspects or characteristics of an image being sought. Beyond simple image searching, some services provide images in conjunction with other information, such as GOOGLE STREET VIEW, which provides images of an area surrounding a specific location. BAIDU IMAGE is a reliable image search tool which may be used to find object related information. Also, YELP provides a MONOCLE feature that allows a user to view businesses nearby using a camera on a portable device, such as a mobile phone, and pointing it at the surroundings which are recognized by the service to provide area specific information.

Users are able to search and find almost everything needed from one or more mobile devices, including wearable devices. However, such information retrieval services are reactive based, as each requires a user to input one or more keywords about the search topic, send the keyword(s) to a search engine, wait for the search engine to find related information, and then receive the related information at the user's mobile device(s). Moreover, the related information may be of an unmanageably large size, unstructured, and un-customized for the user's mobile device(s). Some users may not know how to select appropriate keywords for searching, or may not even realize they need help in keyword searching.

In addition, the related information may not fit on the user's device(s) due to small screen sizes, and users may not able to get real useful information in real time because of the volume of returned information. These limitations and problems increase the complexity of the user experience, reduce service capability, and hurt application usability.

SUMMARY

In one embodiment, a system includes a processing circuit and logic integrated with the processing circuit, executable by the processing circuit, or integrated with and executable by the processing circuit. The logic is configured to cause the processing circuit to obtain an image of an object viewed by a user of an augmented reality or virtual reality device (hereafter the AR/VR device). The logic is also configured to cause the processing circuit to determine one or more keywords that describe the object and search at least one knowledge base using the one or more keywords and contextual factors to produce context relevant to the object. Moreover, the logic is configured to cause the processing circuit to send the context to the AR/VR device.

In another embodiment, a computer program product includes a computer readable storage medium having program instructions embodied therewith. The embodied program instructions are executable by a processing circuit to cause the processing circuit to obtain, by the processing circuit, an image of an object viewed by a user of an AR/VR device. The embodied program instructions also cause the processing circuit to determine, by the processing circuit, one or more keywords that describe the object, and search, by the processing circuit, at least one knowledge base using the one or more keywords and contextual factors to produce context relevant to the object. Moreover, the embodied program instructions cause the processing circuit to send, by the processing circuit, the context to the AR/VR device.

In yet another embodiment, a method includes obtaining an image of an object viewed by a user of an AR/VR device. Also, the method includes determining one or more keywords that describe the object. The method also includes searching at least one knowledge base using the one or more keywords and contextual factors to produce context relevant to the object, and sending the context to the AR/VR device.

Other aspects and embodiments of the present invention will become apparent from the following detailed description, which, when taken in conjunction with the drawings, illustrate by way of example the principles of the invention.

DETAILED DESCRIPTION

Figure 1:
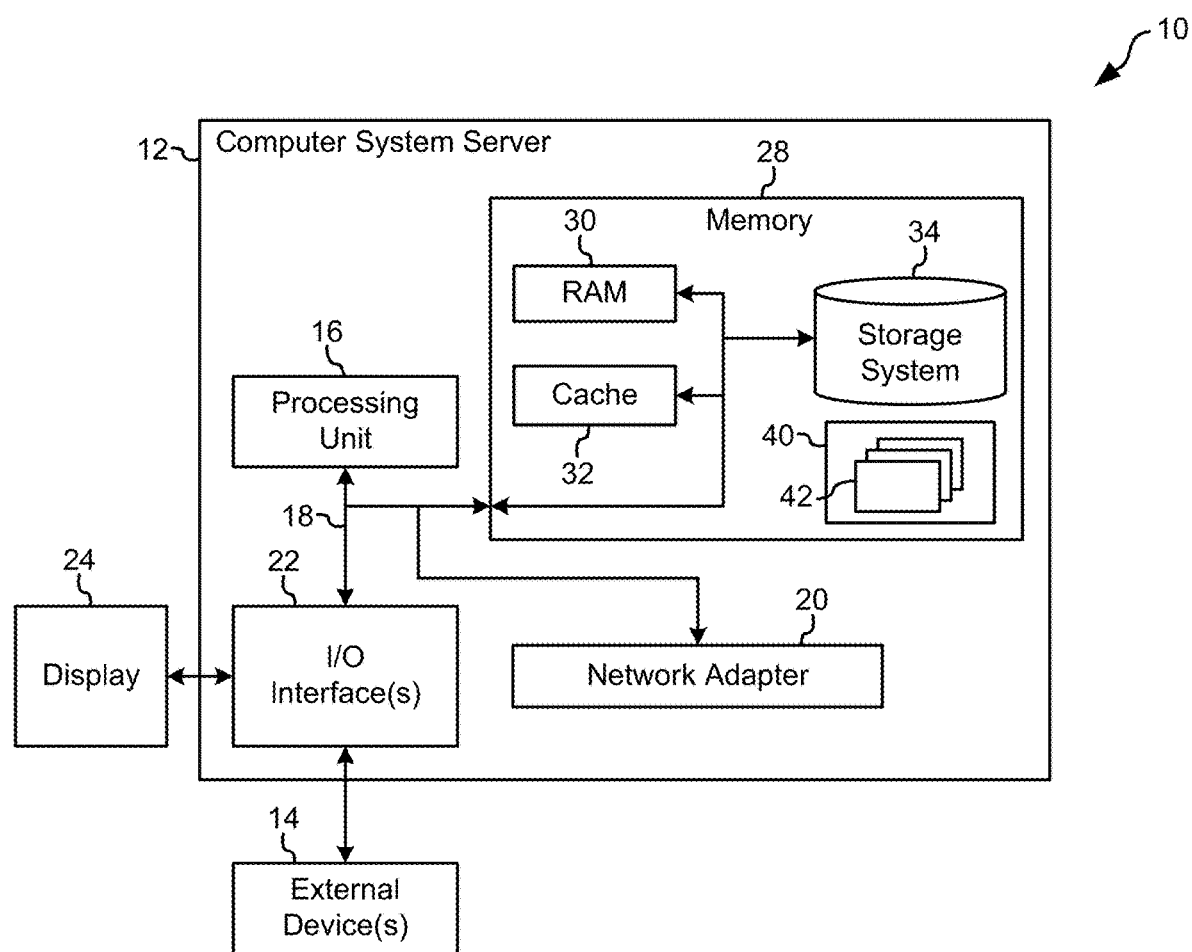
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products that provide a proactive service mode that retrieves desired information utilizing a dynamic object description service integrated real time with at least one knowledge base available over the Internet. An augmented reality (AR) and/or virtual reality (VR) device may be utilized for the dynamic object description service to allow the service to take place in an AR/VR environment.

In one general embodiment, a system includes a processing circuit and logic integrated with the processing circuit, executable by the processing circuit, or integrated with and executable by the processing circuit. The logic is configured to cause the processing circuit to obtain an image of an object viewed by a user of an augmented reality or virtual reality device (hereafter the AR/VR device). The logic is also configured to cause the processing circuit to determine one or more keywords that describe the object and search at least one knowledge base using the one or more keywords and contextual factors to produce context relevant to the object. Moreover, the logic is configured to cause the processing circuit to send the context to the AR/VR device.

In another general embodiment, a computer program product includes a computer readable storage medium having program instructions embodied therewith. The embodied program instructions are executable by a processing circuit to cause the processing circuit to obtain, by the processing circuit, an image of an object viewed by a user of an AR/VR device. The embodied program instructions also cause the processing circuit to determine, by the processing circuit, one or more keywords that describe the object, and search, by the processing circuit, at least one knowledge base using the one or more keywords and contextual factors to produce context relevant to the object. Moreover, the embodied program instructions cause the processing circuit to send, by the processing circuit, the context to the AR/VR device.

In yet another general embodiment, a method includes obtaining an image of an object viewed by a user of an AR/VR device. Also, the method includes determining one or more keywords that describe the object. The method also includes searching at least one knowledge base using the one or more keywords and contextual factors to produce context relevant to the object, and sending the context to the AR/VR device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
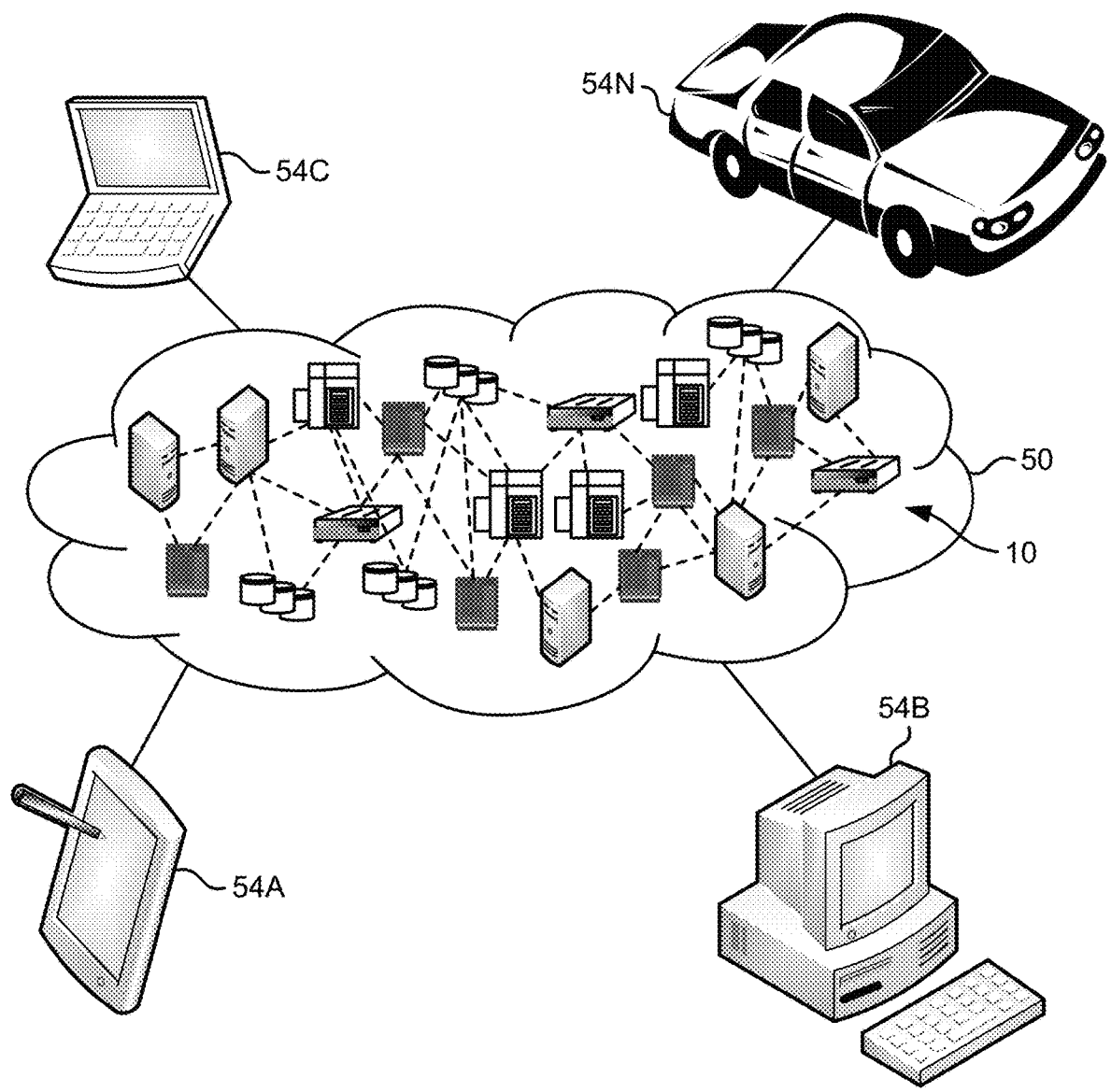
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
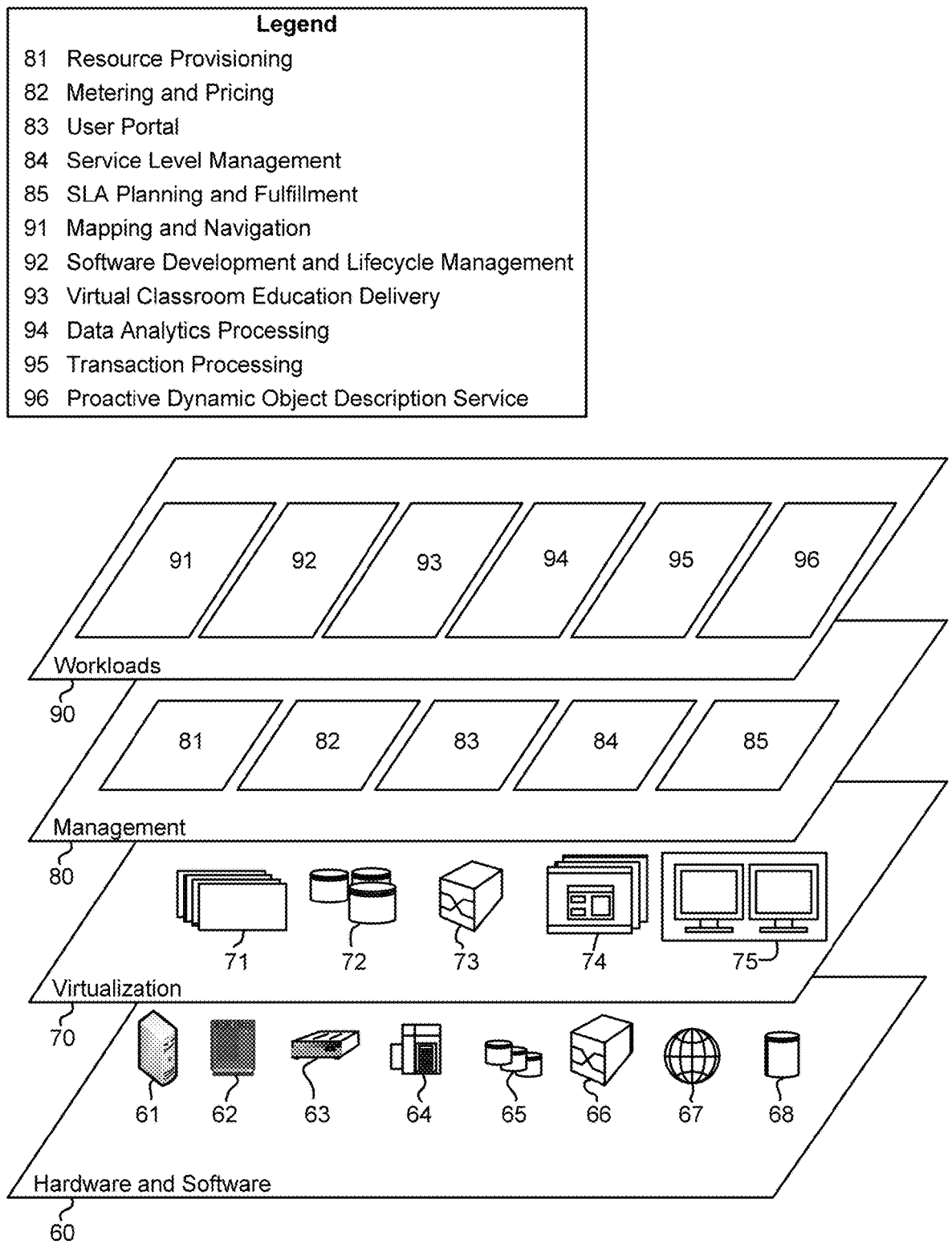
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and proactive dynamic object description service 96. In order to provide a proactive service mode that retrieves desired information in AR/VR environments, a dynamic object description service is provided that is integrated in real time with at least one knowledge base available over the Internet. Also, an AR/VR service platform or application is provided in the AR/VR environment, in one embodiment, that is configured to dynamically request and receive information from the knowledge base(s) that operates on one or more AR/VR devices, smart mobile devices, wearable devices, etc.

Moreover, in another embodiment, a service is provided within the AR/VR environment that determines a best fit set of one or more keywords that describe an object visible to a user in the AR/VR environment to be searched in the knowledge base(s) via the AR/VR service platform. Also, a cognitive image-correlated keyword mapping and selection interface is provided that relates the best fit keyword(s) to objects within the knowledge base(s), in a further embodiment, that allows a cognitive object searching engine to be used to search for content in the knowledge base(s) in accordance with a real time contextual analysis algorithm operating within the AR/VR service platform.

Using the techniques described herein according to various embodiments, an AR/VR device being used by a user is configured to define and collect a set of object-description keywords based on and/or delivered by a keyword repository, and determine the user's physical location using Global Positioning Satellite (GPS) technology, mobile tower triangulation, nearest mobile tower approximation, Wi-Fi connection location, user input, or some other technique known in the art. Also, the AR/VR device is configured to calculate a shooting angle (position of the AR/VR device in the six axes of movement, e.g., up/down, left/right, forward/back) and direction of movement of the AR/VR device in real time. Moreover, the AR/VR device is configured to target and select an object through user interaction with the AR/VR device according to a personal interested profile and predetermined searching criteria, and to send a targeted object to object-keyword description mapping daemon for obtaining the correct description keyword(s) for the targeted object. Thereafter, either the AR/VR device, a local knowledge base, and/or a remote knowledge base is searched using the description keyword(s) for the targeted object and at least one suitable description is obtained from the knowledge base with contextual factors. The AR/VR device is then configured to display returned object related description in text, audio, and/or video in real time to the user.

After some interaction with the dynamic object description service through the AR/VR device, the user is prompted to provide feedback to better the service and provide more efficient searching and faster results for the user, thereby enhancing the user's experience. This adjustment takes place within the user profile and service profile according to the user's provided feedback.

Figure 4:
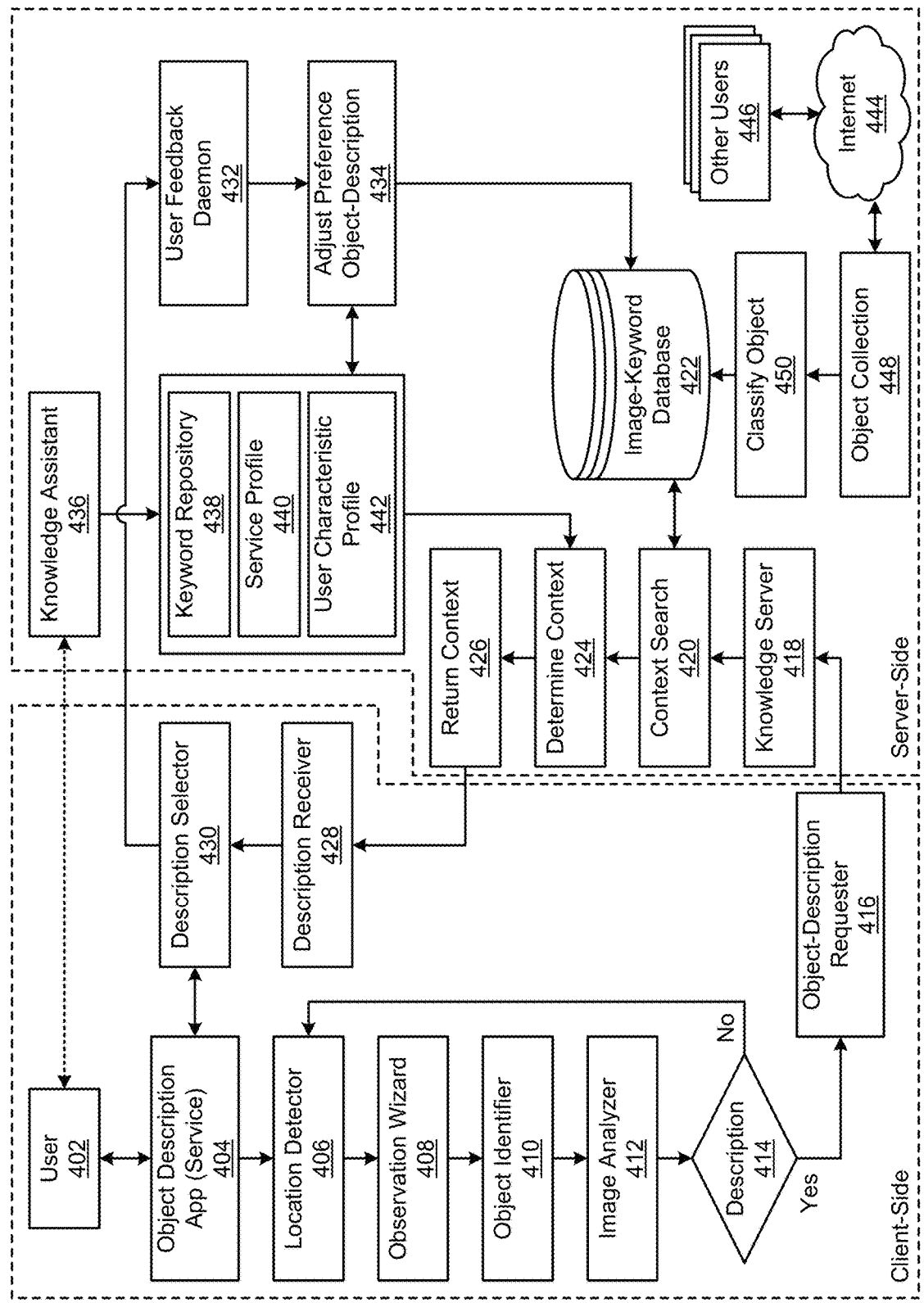
FIG. 4 shows a system for providing a dynamic object description service, according to one embodiment.

FIG. 4 shows a system for providing context retrieval for viewed objects in accordance with one embodiment. The system provides a search of one or more knowledge bases based on a user-observed object/image, which may take into consideration metadata about the viewed object, such as a current location. The user 402 interacts with the AR/VR device, on which an Object Description Application 404 is operating, which may be a service provided from a remote location (the server-side), as a cloud-based service, operating locally on the AR/VR device, etc.

The Location Detector 406 may operate on the AR/VR device and is configured to monitor location related signal changes, in order to indicate a current location of the user 402 based on the current location of the AR/VR device. The Location Detector 406 may collect location data from any suitable technologies, such as GPS, Wi-Fi connection(s), wireless mobile cell tower proximity, etc.

An Observation Wizard 408 is an application or application programming interface (API) resident on the AR/VR device that is configured to track and calculate a shooting angle (direction in all six axes of movement in which the AR/VR device is positioned in real time) and direction of movement of the AR/VR device at any given time. The shooting angle and direction of movement may be output to another process for analysis thereof.

An Image Object Identifier 410 is an application or an API on the AR/VR device configured to determine viewable objects in a field of view of the user 402 at any given time. Any object in the field of view are identified and presented as possible targets for research, to provide context for, etc.

An Image Analyzer 412 is a module on the AR/VR device or accessible to the AR/VR device configured to target potential objects viewable by the user 402 through the AR/VR device. A viewed object is then determined from all the potential objects and is used to create one or more keywords that describe the viewed object, or at least a description of the viewed object that may be used to create keywords.

An Object-Description Requester 416 is a module included in the AR/VR device or accessible to the AR/VR device on the client-side and is configured to send a request to search one or more knowledge base(s) for context about the viewed object. This request may also include a name of the viewed object and metadata related to the viewed object (such as location, position, descriptive terms thereof, time, date, etc.) to a Knowledge Server 418 that is configured to create appropriate descriptions of the viewed object.

The Knowledge Server 418 may utilize an image-keyword database 422 to produce one or more keywords that correlate to the viewed object. The Knowledge Server 418 may be Software as a Service (SaaS) that is accessible to the AR/VR device. This is performed through a Context Search 420, which returns a plurality of possible context for the viewed object. The Context Search 420 may utilize searching criteria to determine the one or more keywords to use to search the knowledge base(s). Then, a Context Determination module 424 determines appropriate context for the viewed object. After the appropriate context is determined, a Context Return module 426 sends the context from the server-side to the client-side via a Description Receiver 428.

The Context Determination module 424 may utilize a User Characteristic Profile 442 of the user 402 to narrow down which of the plurality of possible context for the viewed object to select as the appropriate context.

The User Characteristic Profile 442 may utilize a Service Profile 440 of the user 402 which takes into consideration past interactions with the user 402, past viewing behavior of the user 402, proactive object selection by the user 402, etc., with which to base the selection of the appropriate context.

The Knowledge Assistant 436 may be an interface provided on the AR/VR device that is configured to define and collect a set of image objects and related descriptions for inclusion in a keyword repository 438 that stores keywords appropriate for description of objects viewed by the user 402. Moreover, in a further embodiment, the Knowledge Assistant 436 may be used to manage profiles of users, which include characteristics of the user (such as which objects are typically chosen from all viewable objects, indications of selection of viewable objects, etc.) and a related object-description service that provides simple keywords that describe a viewed object, such as "round" for round objects, "rectangle" for square objects, a specific color or colors of the object, etc.

The Description Receiver 428 is utilized to receive object related description(s) of the viewed object provided by the Return Context module 426. Then, a Description Selector 430 which is a graphical user interface (GUI) configured to provide an option to the user 402 through the AR/VR device to select a preferred description of the viewed object from amongst those returned to the AR/VR device. Moreover, the Description Selector 430 is configured to receive the preferred description of the viewed object from the user 402 (to be output to the user 402 as context with the viewed object). The preferred description of the viewed object may include a textual description of the viewed object, an audio clip that describes the viewed object, and/or a video that describes the viewed object in real time as the user 402 is viewing the object.

In a further embodiment, a User Feedback Daemon 432 may be provided that collects feedback from the user 402 regarding the performance and usability of the context provided for viewed objects over a period of time. Moreover, the User Characteristic Profile 442 may be adjusted by an Adjust Preference Object-Description module 434 based on the feedback, thereby increasing the satisfaction of the user 402 in using the dynamic object description service. In addition, object-keyword correlations in the Image-Keyword Database 422 may be adjusted/corrected to account for feedback from the user 402.

The Image-Keyword Database 422 is an enhanced knowledge center database that stores and manages image and related descriptive terms thereof in an indexed and/or searchable format that is accessible by the Knowledge Server 418.

The Image-Keyword Database 422 may be populated by an Object Collection Agent 448, that is a software application configured to collect objects and related descriptions from the user 402, other users 446, social media, public question and answer sessions, archives available on Internet 444, etc.

Upon collection of the objects by the Object Collection Agent 448, an Object Classification module 450 may provide a classification for each image and associated description(s), thereby allowing the Image-Keyword Database 422 to be indexed according to one or more criteria related to each image stored to the Image-Keyword Database 422.

Figure 5A:
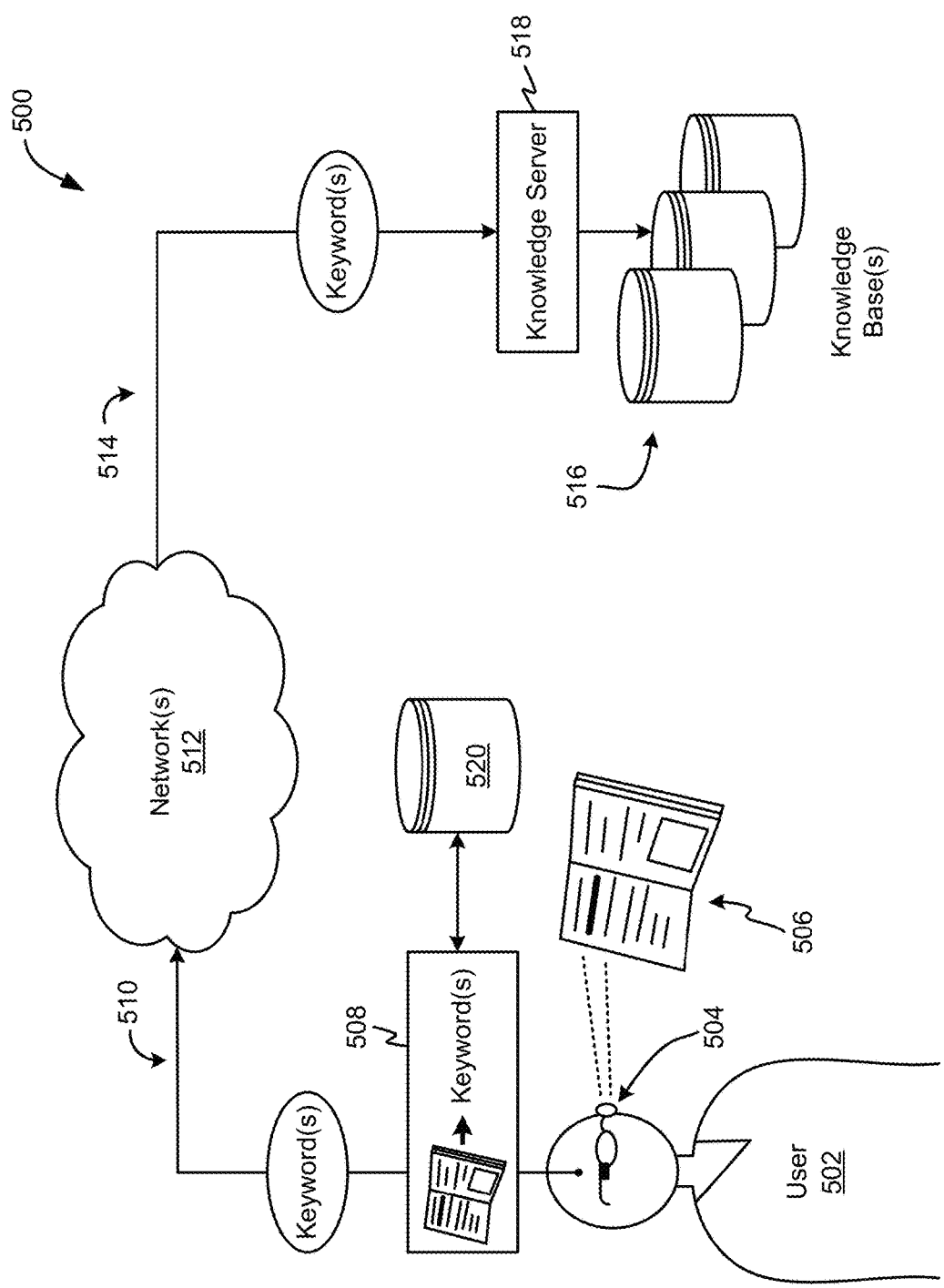
FIGS. 5A-5B show a system for providing a dynamic object description service in another embodiment.
Figure 5B:
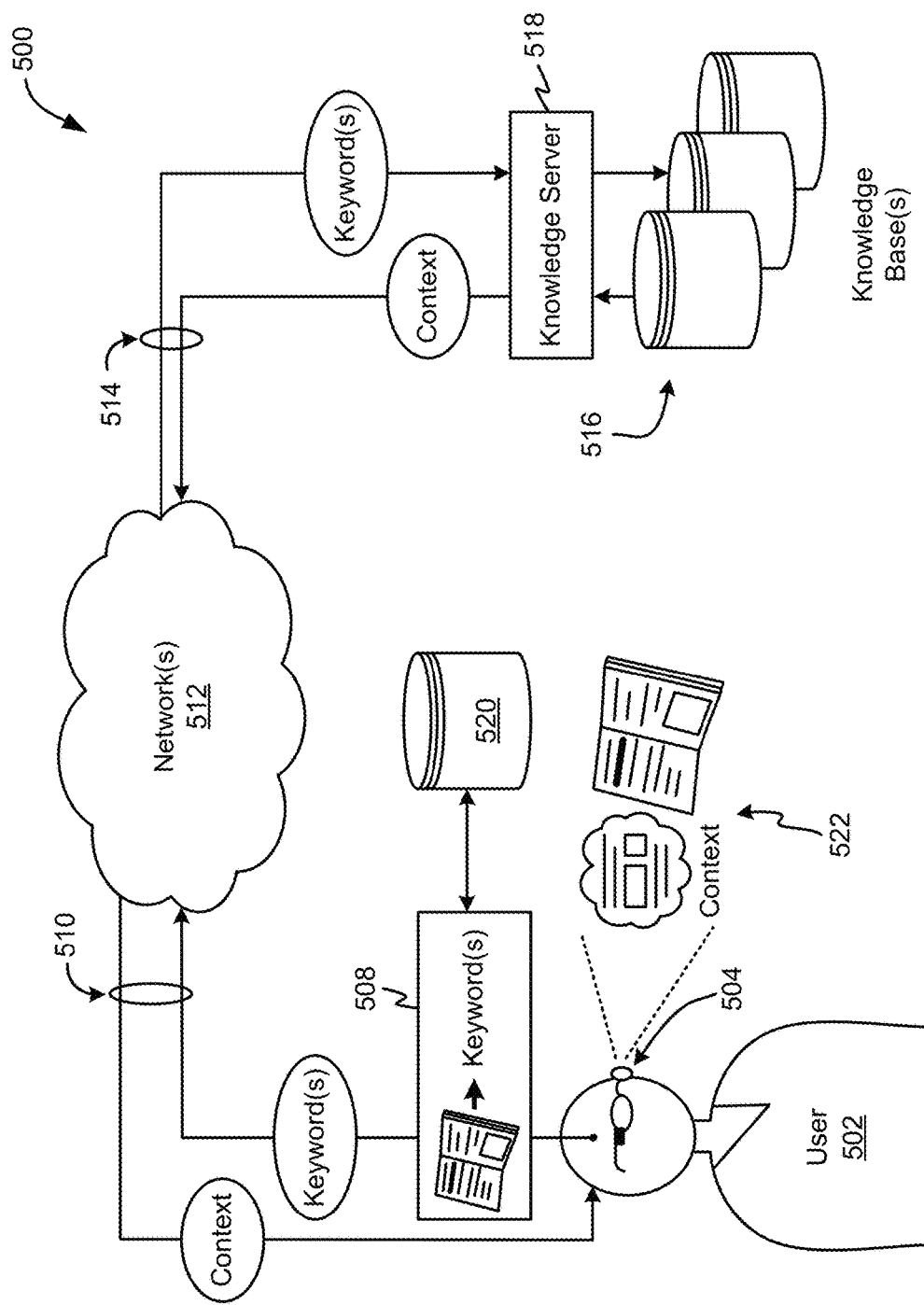

FIGS. 5A-5B show a system 500 for providing the dynamic object description service in another embodiment. As shown, the system 500 includes an AR/VR device 504 being operated by a user 502. The AR/VR device 504 may be any AR device, VR device, or device capable of simulating one or more aspects of a VR environment, such as GOOGLE GLASS, OCULUS RIFT, GOOGLE CARDBOARD, CASTAR, META, SAMSUNG GEAR VR, SONY PLAYSTATION VR, HTC VIVE, EHANG VR GOGGLES, a smart phone, etc.

The system 500 also includes at least one network 512 that connects the AR/VR device 504, via connections 510 and connections 514, to one or more knowledge bases 516. Any suitable knowledge base 516 may be connected via connections 514, such as knowledge bases compiled by organizations or companies that are available to authorized users only, such as IBM's Knowledge Center, IBM's WATSON, etc., generally-available knowledge banks, such as GOOGLE MAPS, GOOGLE TRANSLATE, the Library of Congress, etc., user-provided knowledge banks, such as WIKIPEDIA, ZHIHU, etc.

Now referring to FIG. 5A, in one embodiment, the system 500 is configured to obtain for the user 502 context relevant to an object 506 viewed by the user 502 via the AR/VR device 504 by searching the one or more knowledge bases 516 for context relevant to the viewed object 506. In FIG. 5A, the viewed object 506 is writing in a book, but any viewable object in the field of vision of the user 502 may be the target of the user's gaze and therefore become the viewed object 506. The system 500 is configured to account for the differences between any type of viewed object when determining suitable context that will be relevant to the viewed object. For example, for writing in a book, the system 500 may return information about the book (e.g., name of author, publication date(s) edition number, illustrator, etc.), actions to perform regarding the book (e.g., providing a link to buy the book, providing a copy of the book to be stored for later access, copy a page being viewed to storage, indicating a citation for the passage being viewed, etc.), information related to the book (e.g., other books published in the same time period, other books by the author, biographical information about the author, summary of the content of the book, books having similar subject matter, characters, and/or location, art work(s) associated with the book or time period such as movies, statutes, paintings, etc.), or any other relevant information pertaining to the book, a passage viewed from the book, or characteristics of the book.

To provide this ability, an AR/VR Knowledge Assistant Manager is an interface provided on the AR/VR device 504 or accessible to the AR/VR device 504 that is configured to define and collect a set of image objects and related descriptions for inclusion in an image-keyword database that correlates a plurality of common images with at least one keyword per common image. Vendor and service providers are able to define service types and one or more databases based the service and the type of viewed object. Not all viewed objects may be able to have relevant content associated therewith (such as top secret information, proprietary information or objects, etc.). For example, there may be databases that are purposed for product services and include information on how to purchase a company's products when they are viewed. In another example, a natural knowledge service may include a database that is populated with all known living and extinct species of plants, animals, insects, etc., and when a particular species is viewed, relevant information about that species is returned to the user 502. In another example, an archeological and/or historical service may include several databases that include historical and cultural information that is relevant to viewed objects that relate to a historical event, historical place, archeological dig site, prehistoric cave site, etc. The AR/VR Knowledge Assistant Manager is configured to select one or more appropriate databases and configure related searching algorithms based on the different service being provided to access relevant content from the database(s).

With regard to different purposes of the service (historical vs. natural vs. popular, etc.), the database type and population methods may vary. Historical information is fairly static, so this database will not change much over time, except to add new relevant information as it is discovered. However, a popular service (which may return information about pop culture, iconic people, etc.) changes dramatically from day to day to keep up with trending topics and culturally relevant figures, people, and places.

In a further example, the AR/VR device 504 may be configured to connect to the IBM Knowledge Center. However, this knowledge base utilizes a physical manual library, and therefore to populate this knowledge base, IBM technicians and writers actively incorporate new and updated manuals, readme's, error code information, etc. However, for a museum-related content database, multiple databases may be accessible in a predetermined or dynamic priority order based on likelihood of obtaining relevant content for the viewed object 506. For instance, if the viewed object 506 is an Egyptian bust located in Chicago's Field Museum, the database searching order may be 1) Chicago's Field Museum description database, 2) US museum description database, 3) Wikipedia, 4) Google, and 5) Baidu.

The specifics of a user profile also is taken into consideration when determining which type of database and service type to utilize. When the user is recognized as a middle school student, the type of databases accessed, searching thresholds, and content determined to be relevant will be different from a graduate student specializing in a particular related field of study.

Moreover, in a further embodiment, the AR/VR Knowledge Assistant Manager may be used to manage profiles of users, which include characteristics of the user (such as which objects are typically chosen from all viewable objects, indications of selection of viewable objects, etc.) and a related object-description service that provides simple keywords that describe a viewed object, such as "round" for round objects, "rectangle" for square objects, a specific color or colors of the object, etc.

In addition, a Location Detector may be provided on the AR/VR device 504 that monitors location related signal changes, and indicates a current location of the user 502 based on the current location of the AR/VR device 504. The Location Detector may collect location data from any suitable technologies, such as GPS, Wi-Fi connection(s), wireless mobile cell tower proximity, etc.

An Observation Wizard is an application or API resident on the AR/VR device 504 that is configured to track and calculate a shooting angle (direction in all six axes of movement in which the AR/VR device 504 is positioned in real time) and direction of movement of the AR/VR device 504 at any given time. The shooting angle and direction of movement may be output to another process for analysis thereof.

An Image Object Identifier is an application or an API on the AR/VR device 504 configured to determine viewable objects in a field of view of the user 502 at any given time. The API may call an image service that is supported locally or remotely, such as in the cloud and accessible on the AR/VR device 504 Any objects in the field of view are identified and presented as possible targets for research.

The Image Object Identifier is configured to call a visual identification API or application that identifies and extracts a certain object from the field of vision. For example, current facial recognition, plant species identifier, aircraft identifier, and moving object identifier are all types of Image Object Identifiers that may operate on the AR/VR device 504 alone or in concert with one another, depending on what is within the field of vision of the user 502.

In one example, the IBM Visual Image Recognition Service, available at https://visual-recognition-demo.mybluemix.net/, provides information based on a URL provided to the service, such as likelihood of certain characteristics of the image located at the URL like subject, gender, identity, age, etc. There are also stream analysis services, video analysis modules, audio analysis services, etc., for a wide range of different input types. Any of these types of services may be used for image extraction and identification to determine exactly what is being viewed by the user 502 as the viewed object 506.

In a further embodiment, multiple object identification approaches may be used. This may be useful for identifying related images, such as Bert and Ernie from Sesame Street, ketchup and mustard bottles, etc. Any context information may also be used to improve the accuracy and confidence of the ultimate image selection.

An Image Analyzer 508 is a module on the AR/VR device 504 or accessible to the AR/VR device 504 configured to target potential objects viewable through the AR/VR device 504 according to personal settings and searching criteria to produce one or more keywords that describe the viewed object. The Image Analyzer 508 may utilize an image-keyword database 520 to produce one or more keywords that correlate to the viewed object 506. The Image Analyzer 508 continuously checks related parameters (such as shooting angle, location, object the user 502 is focusing on, etc.) and uses these parameters to determine whether an image has been selected by the user 502. In response to such an image being selected, the image is sent to the Image Object Identifier.

The Image Analyzer 508 may utilize a personal interest profile of the user 502 to narrow down which of the viewable objects provided by the Image Object Identifier to select as the viewed object 506. The personal interest profile may utilize past interactions with the user 502, past viewing behavior of the user 502, proactive object selection by the user 502, etc., with which to base the selection of the viewed object 506. Moreover, the Image Analyzer 508 may utilize searching criteria to determine the one or more keywords to use to search the knowledge base(s) 516. Any technique of creating keywords from an image may be used to determine the one or more keywords. In one example, identification keys used by image identification modules and context variables may be directly used as description keywords. In another example, a context variable may be used as part of a descriptive keyword, with context variables being possible from an IP address, location, URL, etc., which may provide good description keywords. In another example, a normal scientific classification method may be used to produce a description keyword, such as via taxonomy, geographical locational coordinates, etc. In a specific example, in response to the Image Identifier determining the following description keywords: "flower, red color, broad leaf with teeth" and a location of Austin, Tex., the keyword string for the search may be "red flower"+"broad leave with teeth"+"Austin." In another example, the description keyword(s) may be directly received from performing an image analysis, such as Human+female+young+black hair. In another example, biological sciences (e.g., Entomological taxonomy) may be used as an identification key (e.g., https://en.wikipedia.org/wiki/Identification_key is widely used to identify a species). A classification decision tree may also be used to eventually find a correct species. According to another example, modern facial recognition may be used to directly identify a suspect from a video stream, image, etc.

An Object-Description Requester is a module included in the AR/VR device 504 or accessible to the AR/VR device 504 and is configured to send a set of keywords in a request to search the knowledge base(s) 516. This request may also include a name of the viewed object 506 and metadata related to the viewed object 506 (such as location, position, descriptive terms thereof, time, date, etc.) to a Knowledge Server 518 that is configured to create appropriate descriptions of the viewed object 506.

The Knowledge Server 518 operates on the AR/VR device 504 or is accessible to the AR/VR device 504, and may be SaaS in some embodiments. In one embodiment, the Knowledge Server 518 may include and/or be configured to perform the functionality of the Image Analyzer 508 and the Image Object Identifier.

In one embodiment, the Knowledge Server 518 is configured to search the knowledge base(s) 516, find and retrieve context for the viewed object 506, filter the retrieved context to ascertain only relevant context for the viewed object 506, and return the context as descriptions that fit the viewed object. All of this functionality may be performed based on one or more contextual factors and the keywords provided to the Knowledge Server 518.

Now referring to FIG. 5B, after the keyword(s) are provided to the knowledge server 518, a Description Receiver is utilized to receive object related description(s) of the viewed object 506 provided by the knowledge server 518 (collectively referred to herein as context).

Then, a Description Selector which is a GUI or some other user interface configured to provide an option to the user 502 through the AR/VR device 504 to select a preferred description of the viewed object 506 from amongst those returned by the Knowledge Server 518. Moreover, the Description Selector is configured to receive the preferred description of the viewed object 506 from the user 502 (to be output to the user 502 as context with the viewed object 522). The preferred description of the viewed object may include a textual description of the viewed object, an audio clip that describes the viewed object, and/or a video that describes the viewed object in real time as the user 502 is viewing the object.

The AR/VR device 504 may be utilized to output the context, e.g., display the context adjacent the viewed object 522 in real time, play an audio clip about the viewed object, display a video about the viewed object, etc., thereby providing the user 502 with real time analysis of a viewed object that provides context for the viewed object. Such context may include a description and any relevant information that may be useful for the user 502 in the context of the current activity that the user 502 is participating in.

In a further embodiment, a User Feedback Daemon may be provided that operates on the AR/VR device 504 or is accessible to the AR/VR device 504 and collects feedback from the user 502 regarding the performance and usability of the context provided for viewed objects over a period of time. Moreover, the user personal profile may be adjusted based on the feedback, thereby increasing the satisfaction of the user 502 in using the dynamic object description service. In addition, object-keyword correlations in the image-keyword database may be adjusted/corrected to account for feedback from the user 502.

The image-keyword database 520 is an enhanced knowledge center database that stores and manages image and related descriptive terms thereof in an indexed and/or searchable format that is accessible by the Image Analyzer 508.

The image-keyword database 520 may be populated by an Object Collection Agent, that is a software application configured to collect objects and related descriptions from the user 502, other users, social media, public question and answer sessions, archives available on the Internet, etc. Moreover, an Image Service Profile includes predefined service rules, such as image selection rules, default image settings, shooting angle correction settings, etc., that may be associated with an account of the user 502, and may be stored in the AR/VR device 504, on the server side (the Knowledge Server 518), or both.

The User Profile includes related personal characteristics of the user 502 and related preference settings. For instance, a user may want to agree/disagree to select one image from multiple recommended images provided by an image management server and send selection feedback to the Knowledge Server 518 by default. The profile may be stored in the AR/VR device 504, on the server side (the Knowledge Server 518), or both.

Figure 6:
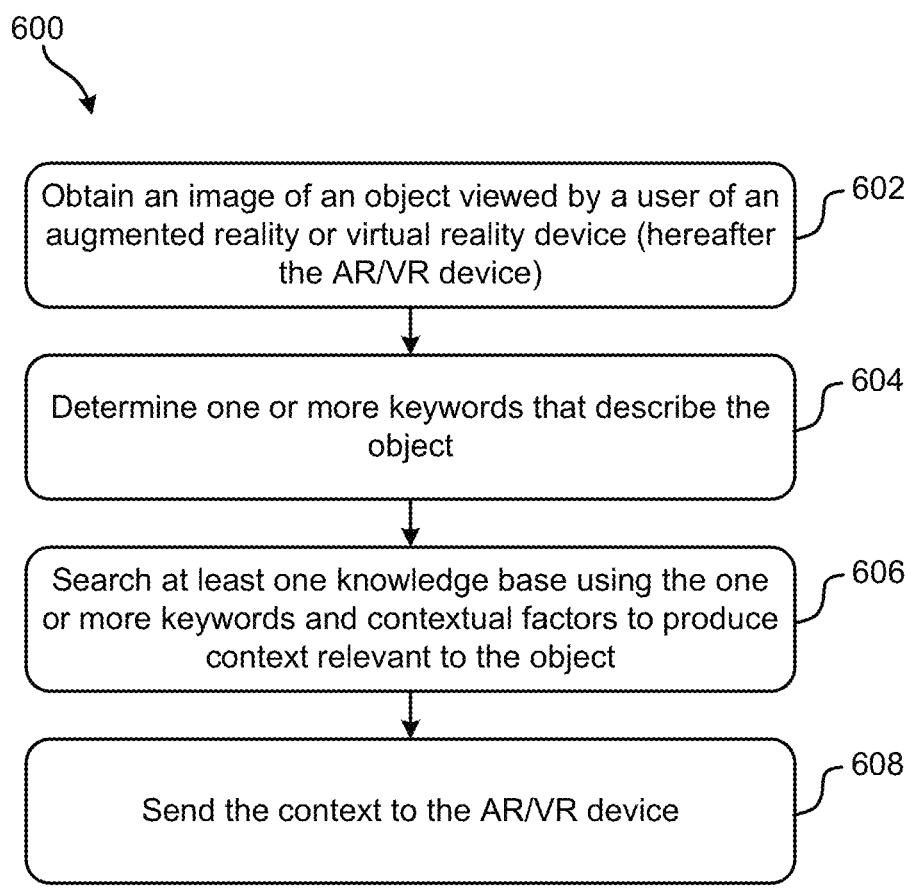
FIG. 6 shows a flowchart of a method, according to one embodiment.

Now referring to FIG. 6, a method 600 is shown according to one embodiment. The method 600 may be performed in accordance with the present invention in any of the environments depicted in FIGS. 1-4B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a cloud server, a portable computer, a handheld or wearable computer, an AR device, a VR device, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a CPU, an ASIC, a FPGA, etc., combinations thereof, or any other suitable computing device known in the art.

As shown in FIG. 6, method 600 may start with operation 602, where an image of an object viewed by a user of an AR/VR device is obtained. Any method of obtaining the image may be used, as described herein or those not specifically described but known in the art.

In accordance with one embodiment, the image of the object viewed by the user of the AR/VR device is obtained in a proactive manner without prompting from the user. For example, the AR/VR device may have an application or routine operating thereon whenever the AR/VR device is in use which is able to interpret cues from the user to determine that the image of the viewed object should be captured to provide context for the viewed object. Such cues may include gazing at an object for a predetermined length of time, winking or blinking (either once or in a predetermined pattern), speaking about the object, pointing at the object, or some other cue that may be provided by the user without requiring a positive enactment of the image capturing methodology.

In an alternate embodiment, the user may provide a positive action to cause the image of the object to be obtained for context to be provided.

In operation 604, one or more keywords that describe the object are determined. In order to determine the one or more keywords, in one embodiment, an image-keyword database may be searched. The image-keyword database correlates a plurality of common images with at least one keyword per common image. Then, the one or more keywords may be selected from the image-keyword database based on an association with an image that is similar to the viewed object. The similarity may be determined based on a correlation calculation that compares the one or more keywords with keywords associated with the images in the database.

In a further embodiment, method 600 may include creating the image-keyword database on a storage medium for use in each keyword determination. Moreover, common images and related sets of keywords may be collected and the common images and their related sets of keywords may be stored to the image-keyword database. This collecting may take place over a period of time with a plurality of interactions by any user with the database, including the user of method 600.

In another embodiment, a physical location of the user may be determined based on a location of the AR/VR device. The location of the user may be used to determine the one or more keywords.

In yet another embodiment, a shooting angle and a direction of movement of the AR/VR device may be calculated. The shooting angle and the direction of movement of the AR/VR device may be used to determine the one or more keywords.

In operation 606, at least one knowledge base is searched using the one or more keywords and contextual factors to produce context relevant to the object. The contextual factors may be fine-tuned based on historical interactions between the user and image searches.

In a further embodiment, the location of the user may be a contextual factor used to search the at least one knowledge base to produce the context, and/or the contextual factors may comprise the shooting angle and the direction of movement of the AR/VR device.

In operation 608, the context is sent to the AR/VR device. The context may include any type of information relevant to the viewed object, such as a textual description of the object, an additional image related to the object, a video related to the object, an audio clip related to the object, etc.

In an optional operation, the context may be output on the AR/VR device. For example, an additional image may be displayed adjacent the viewed image, an audio clip may be played through headphones or a speaker of the AR/VR device, a video may be displayed adjacent the viewed object while associated audio is played through headphones or the speaker, etc. The method of outputting the context is determined based on a format or formats of the context, and the outputting capabilities of the AR/VR device.

In another embodiment, method 600 may include receiving feedback from the user regarding accuracy and usability of the context provided to the AR/VR device. This feedback may be obtained via a user interface on the AR/VR device that queries the user to determine whether the provided context is useful, relevant, and/or desired in regard to the format provided, the timeliness, the quantity, the position in the viewable area, etc. In response to the feedback, the contextual factors used to search the at least one knowledge base using the one or more keywords may be adjusted to tailor the context returned to the user according to the feedback.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a processing circuit; and
logic integrated with the processing circuit, executable by the processing circuit, or integrated with and executable by the processing circuit, the logic being configured to cause the processing circuit to:
obtain an image of an object viewed by a user and within a field of view of the user of an augmented reality and/or virtual reality (AR/VR) device;
determine a set of one or more best fit keywords that describe the object, wherein determination of the one or more best fit keywords includes:
searching an image-keyword database that correlates a plurality of common images with at least one keyword per common image, each keyword being a descriptive term related to an associated common image, wherein the image-keyword database is indexed and searchable; and
selecting one or more keywords from the image-keyword database that are correlated with a common image that resembles the image obtained of the object;
search at least one knowledge base using the one or more keywords to produce context relevant to the object and a current activity that the user is participating in via the AR/VR device;
determine a physical location of the user based on a location of the AR/VR device, and wherein the location of the user is included as one of the one or more keywords used to search the at least one knowledge base;
calculate a six-axis shooting angle and a direction of movement of the AR/VR device, and wherein the shooting angle and the direction of movement of the AR/VR device are used in conjunction with the location of the user to determine the one or more keywords used to search the at least one knowledge base; and
send the context to the AR/VR device.

2. The system as recited in claim 1, wherein the logic is further configured to cause the processing circuit to determine a cue from the user, the cue including either or both of: speaking about the object; and gesturing toward the object; and wherein the image of the object is obtained in response to the cue from the user.

3. The system as recited in claim 1, wherein the logic is further configured to cause the processing circuit to, prior to searching the image-keyword database:
create the image-keyword database on a storage medium accessible to the processing circuit;
collect, from a plurality of user interactions with the image-keyword database, common images and related sets of keywords; and
store the common images and their related sets of keywords to the image-keyword database.

4. The system as recited in claim 1, wherein the object comprises written information; and
wherein the context comprises:
information about the written information;
actions to perform regarding the written information and/or the object; and/or
information related to the written information and/or the object.

5. The system as recited in claim 1, wherein the logic is further configured to cause the processing circuit to:
receive context feedback from the user regarding accuracy and usability of the context provided to the AR/VR device, wherein the context feedback relates to a format of the context, a timeliness of the context, a quantity of the context, and a position of the context within an area viewable to the user through the AR/VR device;
receive selection feedback relating to the user's selections from among multiple recommended images depicting the object;
adjust the one or more keywords used to search the at least one knowledge base to tailor returned context to the user according to the context feedback and/or the selection feedback;
determine which of the at least one knowledge base is most appropriate to search based on a user profile of the user; and
search only the most appropriate knowledge base.

6. The system as recited in claim 1, further comprising:
an object collection agent configured to collect objects and related descriptions from users, social media, public question and answer sessions, and Internet archives; and
an image service profile comprising predefined service rules associated with a user account, the predefined service rules comprising image selection rules; default image settings; object-description rules; and shooting angle correction settings.

7. The system as recited in claim 6, further comprising logic configured to cause the processing circuit to:
determine at least one cue from the user, the at least one cue being selected from the group consisting of: speaking about the object, gesturing toward the object, a single wink, a single blink, a pattern of one or more winks and/or one or more blinks, and combinations thereof; and wherein the image of the object is obtained in response to the cue from the user;
receive context feedback from the user regarding accuracy and usability of the context provided to the AR/VR device, wherein the context feedback relates to a format of the context, a timeliness of the context, a quantity of the context, and a position of the context within an area viewable to the user through the AR/VR device;

receive selection feedback relating to the user's selections from among multiple recommended images depicting the object;
adjust the user profile of the user based at least in part on the context feedback and/or the selection feedback;
determine which of the at least one knowledge base is most appropriate to search based on the adjusted user profile of the user, wherein the at least one knowledge base is selected from the group consisting of: a restricted knowledge base, a generally-available knowledge base, a user-provided knowledge base, and combinations thereof;
search only the most appropriate knowledge base; and
prior to searching the image-keyword database:
   create the image-keyword database on a storage medium accessible to the processing circuit;
   adjust one or more object-keyword correlations in the image-keyword database based on the adjusted user profile of the user;
   collect, from a plurality of user interactions with the image-keyword database, common images and related sets of keywords; and
   store the common images and their related sets of keywords to the image-keyword database; and
wherein the object comprises written information; and
wherein the context comprises:
   information about the written information;
   a list of actions to perform regarding the written information and/or the object; and/or
   information related to the written information and/or the object.

8. A computer program product, the computer program product comprising a computer readable storage medium having program instructions embodied therewith, the embodied program instructions being executable by a processing circuit to cause the processing circuit to:
   obtain, by the processing circuit, an image of an object viewed by a user of an augmented reality and/or virtual reality (AR/VR) device;
   determine, by the processing circuit, one or more keywords that describe the object, wherein determination of the one or more keywords includes:
     searching an image-keyword database that correlates a plurality of common images with at least one keyword per common image, each keyword being a descriptive term related to an associated common image, wherein the image-keyword database is indexed and searchable; and
     selecting one or more keywords from the image-keyword database that are correlated with a common image that resembles the image obtained of the object;
   search, by the processing circuit, at least one knowledge base using the one or more keywords to produce context relevant to the object;
   determine, by the processing circuit, a physical location of the user based on a location of the AR/VR device, wherein the location of the user is included as one of the one or more keywords used to search the at least one knowledge base; and
   calculate, by the processing circuit, a six-axis shooting angle and a direction of movement of the AR/VR device, wherein the shooting angle and the direction of movement of the AR/VR device are used in conjunction with the location of the user to determine the one or more keywords used to search the at least one knowledge base; and
   send, by the processing circuit, the context to the AR/VR device.

9. The computer program product as recited in claim 8, wherein the embodied program instructions are further executable by the processing circuit to cause the processing circuit to determine, by the processing circuit, a cue from the user, the cue including either or both of: speaking about the object; and gesturing toward the object; and wherein the image of the object is obtained in response to the cue from the user.

10. The computer program product as recited in claim 8, wherein the embodied program instructions are further executable by the processing circuit to cause the processing circuit to
   receive, by the processing circuit, selection feedback relating to the user's selections from among multiple recommended images depicting the object; and
   adjust preference settings in a user profile of the user based at least in part on the selection feedback.

11. The computer program product as recited in claim 8, wherein the embodied program instructions are further executable by the processing circuit to cause the processing circuit to:
   receive, by the processing circuit, feedback from the user regarding accuracy and usability of the context provided to the AR/VR device, wherein the feedback relates to a format of the context, a timeliness of the context, a quantity of the context, and a position of the context within an area viewable to the user through the AR/VR device;
   adjust, by the processing circuit, the one or more keywords used to search the at least one knowledge base to tailor returned context to the user according to the feedback;
   determine, by the processing circuit, which of the at least one knowledge base is most appropriate to search based on a user profile of the user; and
   search, by the processing circuit, only the most appropriate knowledge base.

12. A method, comprising:
determining a cue from a user, the cue being selected from the group consisting of: a single wink, a single blink, a pattern including one or more blinks, a pattern including one or more winks, and combinations thereof;
obtaining, in response to determination of the cue from the user, an image of an object viewed by the user of an augmented reality and/or virtual reality (AR/VR) device;
determining one or more keywords that describe the object, wherein determination of the one or more keywords includes:
   searching an image-keyword database that correlates a plurality of common images with at least one keyword per common image, each keyword being a descriptive term related to an associated common image, wherein the image-keyword database is indexed and searchable; and
   selecting one or more keywords from the image-keyword database that are correlated with a common image that resembles the image obtained of the object;
searching at least one knowledge base using the one or more keywords to produce context relevant to the object and a current activity that the user is participating in via the AR/VR device;
determining a physical location of the user based on a location of the AR/VR device, and wherein the location of the user is included as one of the one or more keywords used to search the at least one knowledge base;

calculating a six-axis shooting angle and a direction of movement of the AR/VR device, and wherein the shooting angle and the direction of movement of the AR/VR device are used in conjunction with the location of the user to determine the one or more keywords used to search the at least one knowledge base; and sending the context to the AR/VR device.

13. The method as recited in claim 12, further comprising, prior to searching the image-keyword database:

creating the image-keyword database on a storage medium; and collecting common images and related sets of keywords and storing the common images and their related sets of keywords to the image-keyword database.

14. The method as recited in claim 12, further comprising:

receiving context feedback from the user regarding accuracy and usability of the context provided to the AR/VR device, wherein the context feedback relates to a format of the context, a timeliness of the context, a quantity of the context, and a position of the context within an area viewable to the user through the AR/VR device;

adjusting the one or more keywords used to search the at least one knowledge base to tailor returned context to the user according to the context feedback;

determining which of the at least one knowledge base is most appropriate to search based on a user profile of the user; and searching only the most appropriate knowledge base.

* * * * *